(12) United States Patent
Ogrizek et al.

(10) Patent No.: US 8,353,620 B2
(45) Date of Patent: Jan. 15, 2013

(54) HAND-HELD STICK BLENDER COMPRISING HOUSING SHELLS THAT ARE CONNECTED BY A TENSIONED COVER

(75) Inventors: Darko Ogrizek, Velenje (SI);
Aleksander Sedovsek, Mozirje (SI);
Uros Semeja, Smartno ob Paki (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 712 days.

(21) Appl. No.: 11/990,537

(22) PCT Filed: Jul. 7, 2006

(86) PCT No.: PCT/EP2006/064007
§ 371 (c)(1),
(2), (4) Date: Feb. 15, 2008

(87) PCT Pub. No.: WO2007/020133
PCT Pub. Date: Feb. 22, 2007

(65) Prior Publication Data
US 2009/0284027 A1 Nov. 19, 2009

(30) Foreign Application Priority Data

Aug. 17, 2005 (DE) .................... 10 2005 038 917

(51) Int. Cl.
*A47J 43/07* (2006.01)
*A47J 43/044* (2006.01)
(52) U.S. Cl. ..................................... 366/129
(58) Field of Classification Search .................. 366/129, 366/331, 344; 99/348; 403/326, 344; 241/46.17
See application file for complete search history.

(56) References Cited

U.S. PATENT DOCUMENTS

| 4,653,783 | A | | 3/1987 | Steup | |
|---|---|---|---|---|---|
| 4,850,699 | A | | 7/1989 | Rebordosa | |
| 5,368,384 | A | * | 11/1994 | Duncan et al. | 366/129 |
| 5,567,047 | A | * | 10/1996 | Fritsch | 366/129 |
| 6,789,933 | B2 | * | 9/2004 | Gili et al. | 366/129 |
| 6,811,298 | B2 | * | 11/2004 | Penaranda et al. | 366/129 |
| 6,974,244 | B1 | * | 12/2005 | Lin | 366/129 |
| 8,038,338 | B2 | * | 10/2011 | Maleiro Vilarino et al. | 366/129 |
| 2003/0066437 | A1 | | 4/2003 | Pavlovic et al. | |
| 2003/0156899 | A1 | | 8/2003 | Penaranda et al. | |
| 2004/0165946 | A1 | | 8/2004 | Areh et al. | |
| 2008/0093369 | A1 | * | 4/2008 | Delopst et al. | 220/677 |
| 2009/0213685 | A1 | * | 8/2009 | Mak et al. | 366/129 |

FOREIGN PATENT DOCUMENTS

| DE | 77 16 607 U | | 9/1977 |
|---|---|---|---|
| EP | 1 138 238 | | 10/2001 |
| FR | 2794017 | * | 12/2000 |
| FR | 2921243 | * | 3/2009 |
| WO | WO 2007020133 A1 | * | 2/2007 |

* cited by examiner

*Primary Examiner* — Charles E Cooley
(74) *Attorney, Agent, or Firm* — James E. Howard; Andre Pallapies (57) ABSTRACT

A hand-held kitchen appliance, in particular a stick blender, comprising a housing with at least one first housing shell, a second housing shell and a fixing element for connecting the two housing shells. According to the invention, the fixing element comprises a tensioning element, which engages with the first housing shell at least at two separate fixing points, pressing the first housing shell against the second housing shell at said two points. The kitchen appliance and the method for producing the same are characterized by a particularly simple construction and produce an excellent seal for the housing despite the use of a reduced number of screw connections.

15 Claims, 9 Drawing Sheets

HAND-HELD STICK BLENDER COMPRISING HOUSING SHELLS THAT ARE CONNECTED BY A TENSIONED COVER

BACKGROUND OF THE INVENTION

The invention relates to a hand-held kitchen appliance, in particular a stick blender, comprising a housing with at least one first and one second housing shell and a fixing means for connecting the two housing shells to each other.

Known from EP 0 283 642 is a blender comprising a motor arranged in a housing to drive a mixing rod with it being possible to assemble the housing from housing portions without screw and adhesive connections. For this, the individual components are arranged in relation to each other and equipped with lugs and projections for hooking together or for clipping together in such way that, after the assembly of all parts, a fully assembled blending device is obtained which is completely closed all round its outside contour. Hereby, substantially tubular housing parts are connected to each other by means of hooks and corresponding recesses, with a cover being inserted in an upper opening of a handle portion and being latched to the tubular housing parts.

When producing kitchen appliances it is of particular importance that the production and assembly of the individual parts of the device are as simple and efficient as possible, wherein, however, the housing should protect the interior of the kitchen appliance from external influences as well as possible. For this, in particular gaps between two housing shells are to be avoided. One problem with known kitchen appliances is the fact that housing parts lying one on top of the other could not always be connected in a gap-free manner without having to position the housing parts precisely in relation to each other. Production tolerances and inaccuracies in the individual housing parts also complicated the assembly of the housing so that reworking was necessary in the case of incompletely closed housings.

SUMMARY OF THE INVENTION

It is therefore a task of the present invention to provide a hand-held kitchen appliance and a method for the production of a kitchen appliance which can be closed quickly in a sealed manner in a simple way.

According to the invention, this object is achieved by the hand-held kitchen appliance and the method for the production of a kitchen appliance as disclosed in the independent claims.

Advantageous embodiments and further developments, which may each be used individually or combined with each other as desired are the subject matter of the relevant dependent claims.

The hand-held kitchen appliance according to the invention, in particular a stick blender, comprising a housing with at least one first and one second housing shell and a fixing means for connecting the two housing shells to each other, provides that the fixing means comprises a clamping element, which engages on the first housing shell on at least two separate fixing points and presses the first housing shell against the second housing shell at the two fixing points.

Unlike conventional fixing methods, in which, for example, a screw engages at a first fixing point of a first housing shell and presses this under tension onto a second housing shell, the clamping element engages at at least two separate fixing points on the first housing shell. The clamping element divides the clamping force between at least two separate fixing points. This makes it particularly simple to fix the first housing shell onto the second housing shell. The force for connecting the two housing shells is conducted directly to the point where it is required to achieve a gap-free connection of the housing shells to each other. The clamping element has in particular a bracketing function with which the two housing shells are bracketed together. The clamping element acts in particular as an at least two-armed hook, with which the first housing shell is pulled against the second housing shell.

The kitchen appliance can be assembled from two or more housing shells. The clamping element can be formed by a, in particular separate from the housing shells, housing clamping cover, which is connected to the two housing shells along a second connecting line in a gap-free manner. However, the housing clamping cover can also be embodied in one piece with the housing shell and coupled to this be means of a web, for example. The housing shells are in particular semi-tubular or have a cylinder segment shape for example.

The use of the clamping element enables the number of screws or screw connections required to close the housing in a gap-free and tight manner to be reduced. A corresponding arrangement of the clamping element, in particular the embodiment of the clamping element as a housing clamping cover, enables the space required for conventional fixing means in the interior of the housing to be saved thus enabling the kitchen appliance to be given a more compact and handy design.

The clamping cover can bracket the two housing shells together. In particular a tight connection is achieved between the housing clamping cover and the housing shells along the second connecting line thus effectively preventing the penetration of dirt into the interior of the housing.

In a particularly preferred embodiment of the present invention, the clamping element comprises at least a first, a second and a third connecting element, with the clamping element being fixed to the first and the second connecting element on the first housing shell and to the third connecting element on the second housing shell.

The first and the second connecting element can be formed from a connecting projection which engages on the respective housing shell into a connecting receptacle. The connecting elements press the two housing shells together in particular along a first connecting line formed by their edges, with the action of the force acting directly on the first connecting line due to the connecting elements. Hence, the clamping element engages via the two connecting elements on different fixing points on the first housing shell.

Advantageously, the third connecting element establishes a screw connection. Therefore, only one screw connection is required at an end of the kitchen appliance facing away from a tool to connect the two housing shells in a sealing and gap-free manner to each other. This simplifies in particular the assembly of the kitchen appliance since only one screw has to be tightened. However, the quality of the connection between the two housing shells corresponds to that of one using at least two screw connections. In principle, it is possible to provide further connecting elements which engage on the first housing shell.

For example, a fourth connecting element is provided on the clamping element, with which the clamping element is fixed to the first or the second housing shell. The use of the clamping element achieves a multipoint fixing of the housing shells to each other, without a corresponding number of screw connections being necessary.

The two housing shells can be connected to each other on a first connecting line formed along their edges by means of a housing groove and housing spring. For this, the housing groove engages in the housing spring and hence ensures the gap-free sealing of the assembled housing.

The kitchen appliance is preferably electromotive. It comprises a drive and can in particular be connected to a tool. The kitchen appliance is in particular a stick blender. The housing shells can substantially be half-shells, i.e. substantially two shells are assembled from a substantially fully closed housing. The housing clamping cover is in particular arranged at the top side on an end of the kitchen appliance opposite to the tool.

The fixing points have a distance between each other of in particular at least 2 cm, in particular at least 3 cm, preferably at least 4 cm. A spacing of the fixing points of this kind ensures the appropriate distribution of the closing force for closing the housing.

The method according to the invention for the production of a kitchen appliance, in particular a stick blender comprising one first and one second housing shell and a housing clamping cover so that the housing shells form a substantially closed housing on the housing clamping cover, provides the following steps: assembly of the housing shells along a first connecting line formed by the edges of the housing shells; engagement of the housing clamping cover on at least two separate fixing points on the housing shell; pressing together of the two housing shells by means of the housing clamping cover in such a way that the first housing shell is pressed against the second fixing shell at the two fixing points.

The method according to the invention facilitates the particularly simple production of a kitchen appliance, which significantly simplifies the assembly of the housing. The method causes the individual housing parts, in particular the two housing shells, to be pressed against each other with a high degree of tightness so that even with comparatively high production tolerances and inaccuracies in relation to the housing parts, a high degree of tightness is achieved. Complex closing of the housing is simplified although fewer screw connections are required to close the housing.

BRIEF DESCRIPTION OF THE DRAWINGS

Further advantageous details and particular embodiments will be described in more detail with reference to the following drawings, which do not restrict present invention but are only intended as an illustration for purposes of example, wherein.

DESCRIPTION OF THE PREFERRED EMBODIMENTS

Figure 1:
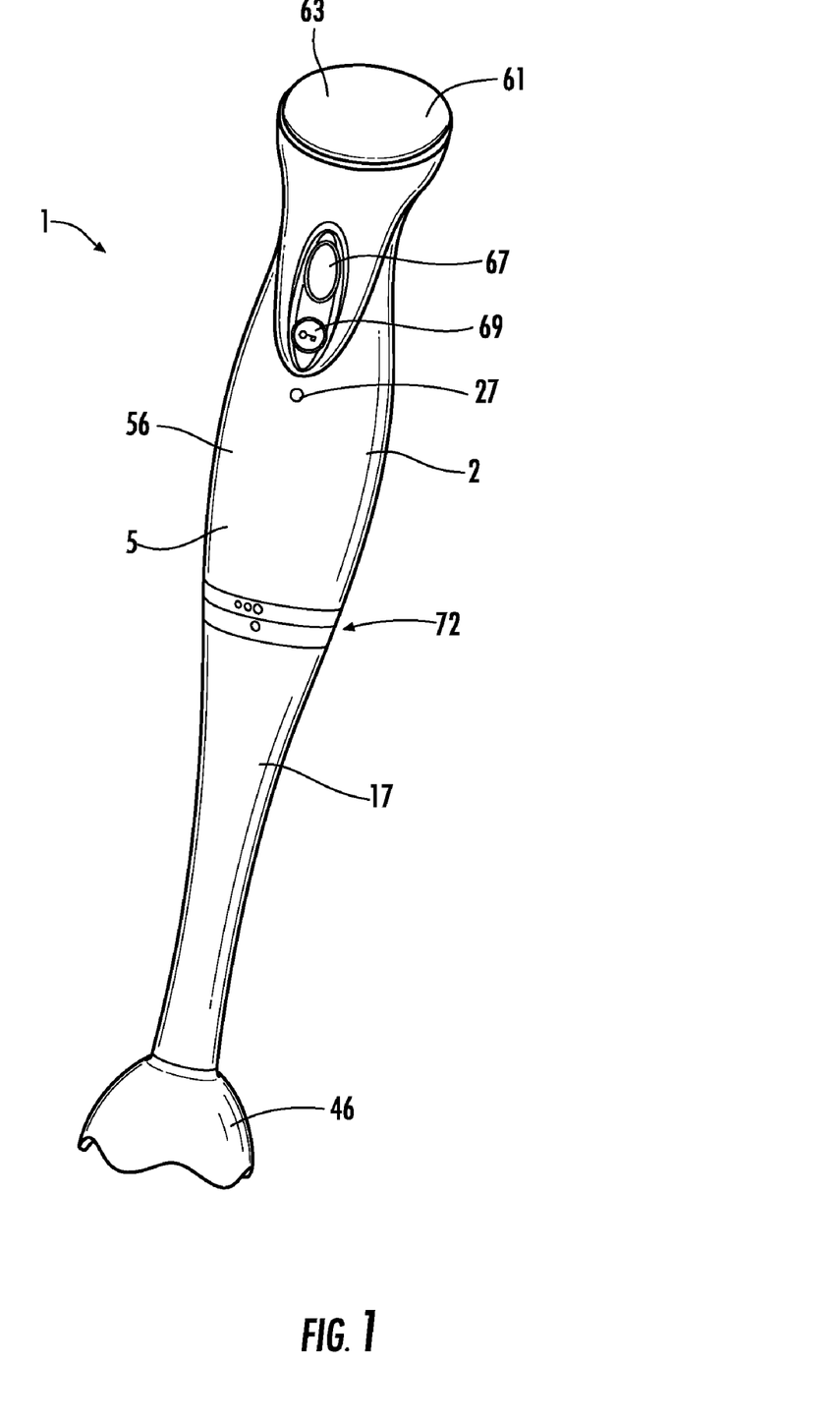
FIG. 1 shows a kitchen appliance according to the invention embodied as a stick blender in a perspective top view

FIG. 1 shows a kitchen appliance according to the invention 1 embodied as a stick blender 2. Mounted on the stick blender 2 is a tool 17 embodied as a cutting tool or pureeing tool by means of a bayonet lock 72. The tool 17 comprises a tool head 46 with corresponding blades or mixing elements (not shown). The stick blender 2 comprises a housing 5 with a first housing shell 56, a housing clamping cover 63 embodied as a clamping element 61 and a second housing shell 57 (see FIG. 2). A charging status display 27 indicates whether the stick blender 2 is ready for operation, in particular whether it is sufficiently charged. An on-switch 67 is used to put the stick blender 2 into operation. However, the on-switch 67 only works when it is unlocked by a safety switch 69. The safety switch 69 which is separated from the on-switch 67 effects an electrical interlocking which only unlocks or releases the on-switch 67 with a time delay after the actuation of the safety switch 69. This ensures that the stick blender 2 is not put into operation unintentionally which, in particular in a household with children, also increases the safety.

Figure 2:
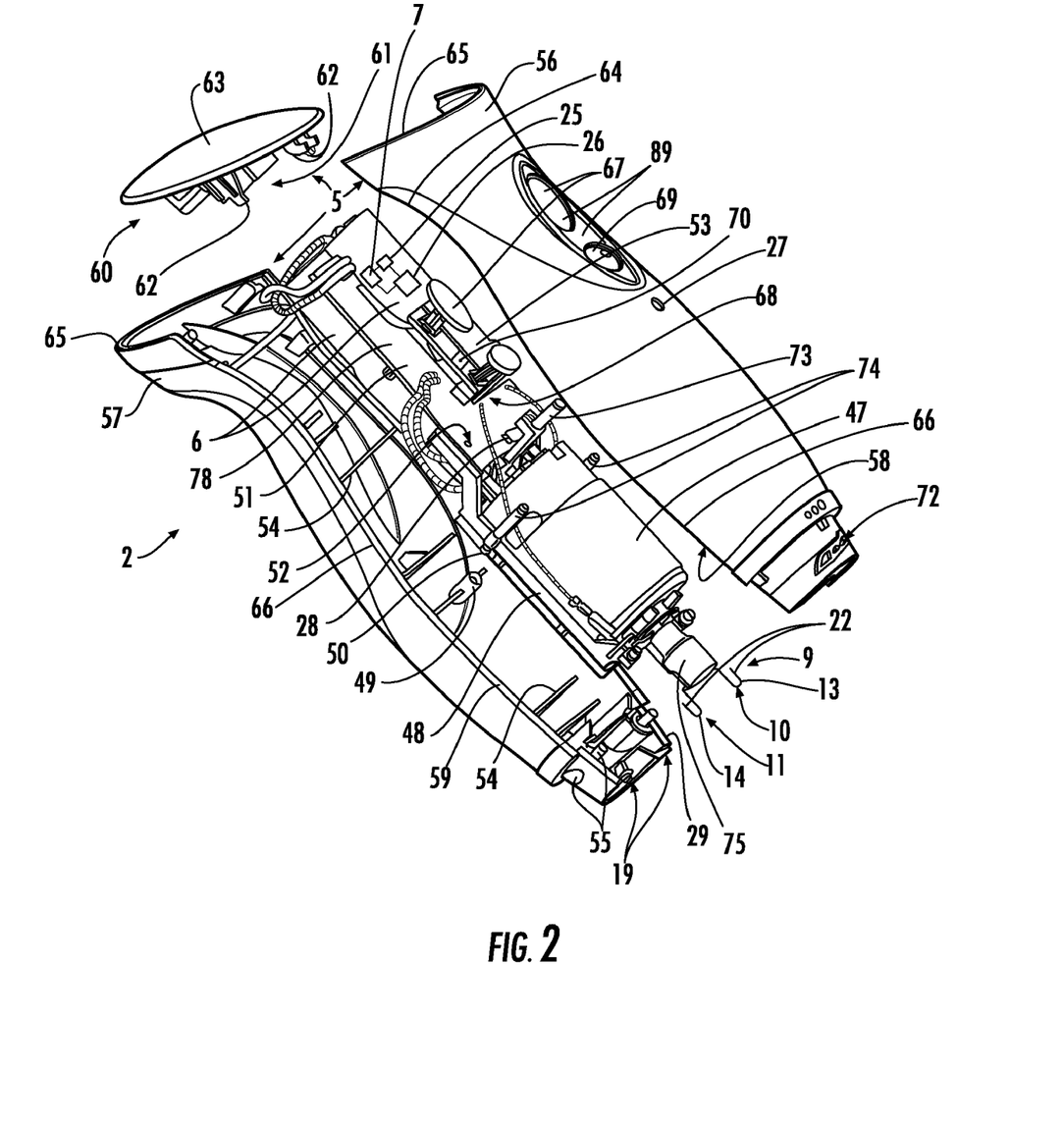
FIG. 2 shows the stick blender according to FIG. 1 in a perspective exploded view

FIG. 2 shows a stick blender according to the invention 2 in a perspective exploded view comprising a housing 5 which is formed by a first housing shell 56, a second housing shell 57 and a housing clamping cover 63. The housing 5 accommodates a motor 47, control electronics 51 on a printed circuit board 78 and a battery 6. The motor 47, the printed circuit board 78 with the control electronics 51 and the battery 6 are mounted on a premounting support 48. The motor 47 and the battery 6 are fixed to the premounting support 48 which may be inserted in the housing 5. The premounting support 48 is connected to the housing 5 without adhesive and without screws. For this, the premounting support 48 comprises latching elements 49, 74, with which it is fixed on corresponding counterelements 50 on the housing 5, for example by clipping-on. The control electronics 51 are clipped on by means of first latching means 52. An electric switch 67, 69, an on-switch 67 and a safety switch 69 are also clipped onto the premounting support 48 by means of second latching means 53. The motor 47 and the battery 6 are clipped onto the premounting support 48. The premounting capability and the screw-free connectability of the individual components enables the production of the stick blender 2 to be significantly simplified and made much more cost-effective. The two housing shells 56, 57 are connected to each other along a housing groove 58 or housing spring 59 along a first connecting line 64, which is formed by edges 66 of the two housing shells 56, 57, in a gap-free manner. The housing clamping cover 63 is connected along a second connecting line 65 to the two housing shells 56, 57 in a substantially gap-free manner.

The housing clamping cover 63 serves as a clamping element 61, which connects the two housing shells 56, 57 to each other by means of a fixing means 60. The clamping element 61 engages on the first housing shell 56 on at least two separate fixing points 62 and presses the first housing shell 56 against the second housing shell 57 at the two fixing points 62. The premounting support 48 with the motor 47 and the battery 6 are supported by means of supports 54 in the housing shells 56, 57 and hence fixed without adhesive and without screws.

Provided on the battery 6 is a safety device 7, which protects the battery 6 from overpressure, the formation of metallic lithium at the electrodes of the battery 6 or the formation of gas in the battery 6. In addition, a control device 26 comprising a temperature sensor 25 ensures that the battery 6 is protected against excessive temperature fluctuations which could result in an (interim or continuing) impairment of the performance of the battery 6. The control device 26 can regulate the temperature of the battery 6 within a temperature range. The safety device 7 specifies a maximum charging current or a maximum discharge current and hence increases the safety of the lithium-ion battery 6. The printed circuit board 78 is attached to the premounting support 48 by means of first latching means 52. An on-switch 67 and a safety switch 69 are clipped onto the printed circuit board 78 by means of second latching means 53. The first housing shell 56 comprises in the region of the switches 67, 69 a rubber membrane 89 sprayed on using a 2-component method which protects the underlying switches 67, 69. The on-switch 67 is unlocked by the safety switch 69 in that the safety switch 69 is actuated a short time before the on-switch 67. Provided for this is a time integration circuit 70 which only permits unlocking with a delay of 0.3 seconds. The safety switch 69 and the time integration circuit 70 form an electronic interlock 68 for the stick blender 2. The charging status of the battery 6 is displayed by means of a charging status display 27. The charging status display 27 comprises an LED display 28 on the printed circuit board 78 the light of which is diverted outward by a fiber-optic conductor 73. A tool 17 (see FIG. 3) is connected by means of a bayonet lock 72 to the stick blender 2, with a rotor 75 of the motor 47 being connected to a shaft 76 (see FIG. 3) of the tool 17 in a torsionally resistant manner. The two housing shells 56, 57 are connected to each other on the tool-side end of the stick blender 2 by means of screw fixing means 55. To charge the battery 6, two sliding contacts 10, 11 embodied as spring elements 22 are provided each comprising a slider 13, 14. The two sliding contacts 10, 11 provide an electric coupling 9 for the transmission of electric energy from a charging station 8 (see FIG. 3) to the stick blender 2. The two sliders 13, 14 are guided by means of feedthrus 19 through a wall 29 of the second housing shell 47.

Figure 3:
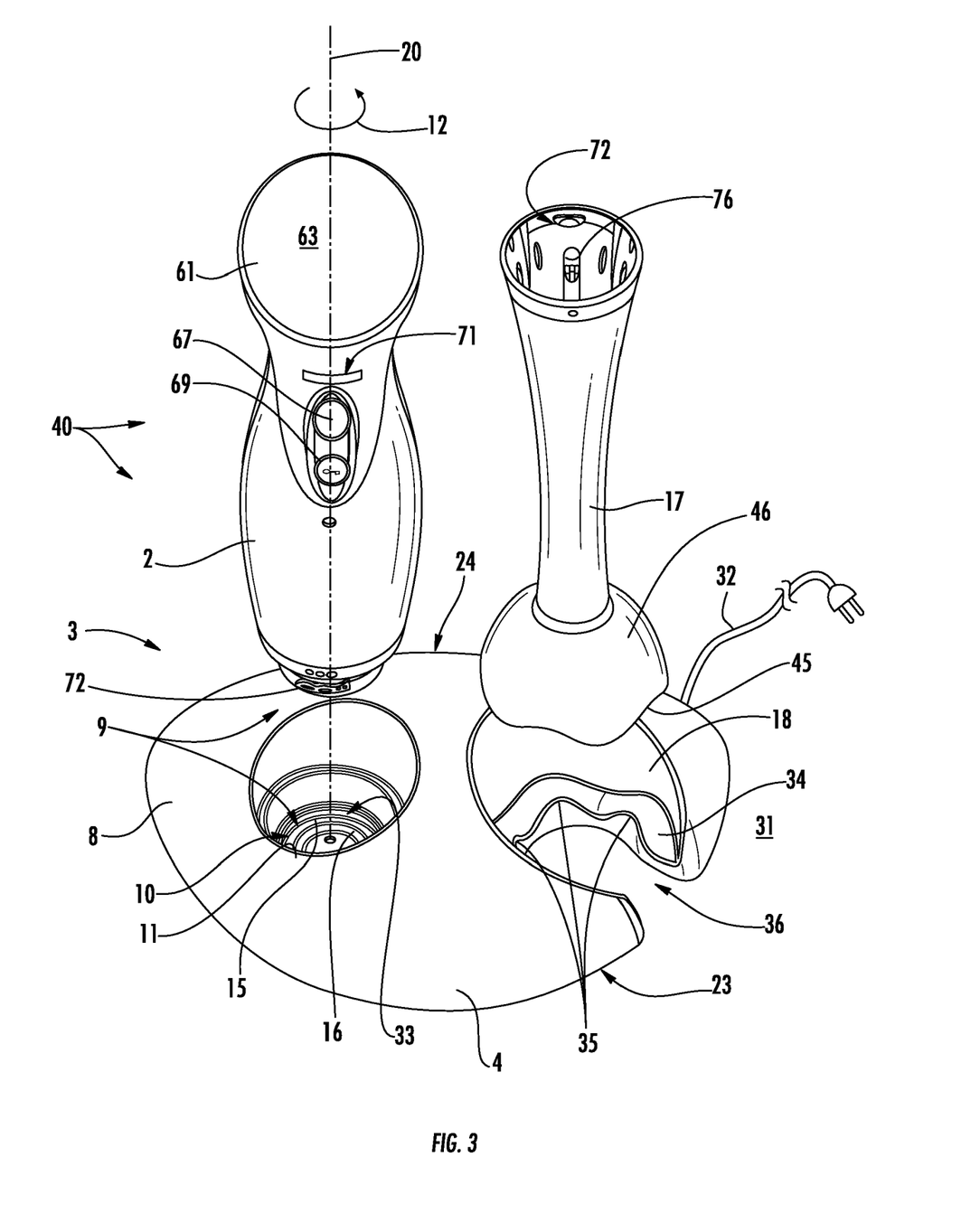
FIG. 3 shows the kitchen appliance according to the invention according to FIG. 1 with a charging station in a perspective oblique view obliquely from above

FIG. 3 shows the stick blender according to the invention 2 according to FIG. 2 with a charging station 8 and a tool 17 in a perspective oblique view obliquely from above. The battery-6-operated stick blender 1 and the charging station 8 for the stick blender 2 for charging the battery 6 form a charging system 3, with the stick blender 2 being connectable to the charging station 8 via an electric coupling 9 during the charging of the battery 6. The coupling 9 transmits electrical energy from the charging station 8 to the stick blender 2. The coupling 9 permits the rotation of the stick blender 2 relative to the charging station 8 so that the stick blender 2 can be used simply and without the precise alignment of its angle of rotation 12 relative to the charging station 8 in the charging station 8. The coupling 9 comprises two sliding contacts 10, 11 with two sliders 13, 14 and two slip rings 15, 16 and permits an angle of rotation 12 of more than 360°. This facilitates a particularly simple coupling of the stick blender 2 to the charging station 8. The slip rings 15, 16 form electric contact surfaces 33 for the production of a galvanic contact between the battery 6 in the stick blender 2 and the charging station 8. The charging station 8 is electrically connected to an external power supply (not shown). The charging station 9 forms a holder 4 for the stick blender 2 and can be attached by means of a fixing surface 24 to a wall 30 (see FIG. 5) or placed by means of a standing surface 23 on a surface 31 such as, for example, a kitchen countertop. The holder 4 comprises a tool holder 18 for the tool 17, for which the tool holder 18 comprises a receiving base 34 with undulations 35 which are adapted to the shape of the tool head 46 and its contour 45 in such a way that the secure holding of the tool 17 is ensured when the tool 17 is placed in the tool holder 18. If the holder 4 is attached to the wall 30 (see FIG. 5), the tool 17 can also be suspended in the tool holder 18 in that the tool 17 is pushed through a radial gap 36 in the annular tool holder 18. The charging station 8 comprises electric lines 32 which can be connected to an external power supply (not shown). The stick blender 2 and the tool 17 are attached by means of a bayonet lock 72 by rotation by approximately 120° about a longitudinal axis 20. Hereby, a shaft 76 of the tool 17 is coupled to the rotor 75 (see FIG. 2) of the motor 47. The power of the stick blender 2 can be set by means of an actuating means 71. In particular, it is possible to choose between different speeds or power outputs such as, for example, 100 W, 200 W and 300 W. The multifunctional holder 4 for the stick blender 2 and the stick blender 2 represent an arrangement 40 which is particularly advantageous for the use of the stick blender 2. In particular, the stick blender 2 can hereby be gripped and used in a simple manner without a disruptive electric cable. After use, the stick blender 2 can be placed quickly and simply in the charging station 8. The holder 4 enables the stick blender 2 to be placed both on a surface 31 and on a wall 30 such as, for example, a kitchen wall or a cupboard wall.

Figure 4:
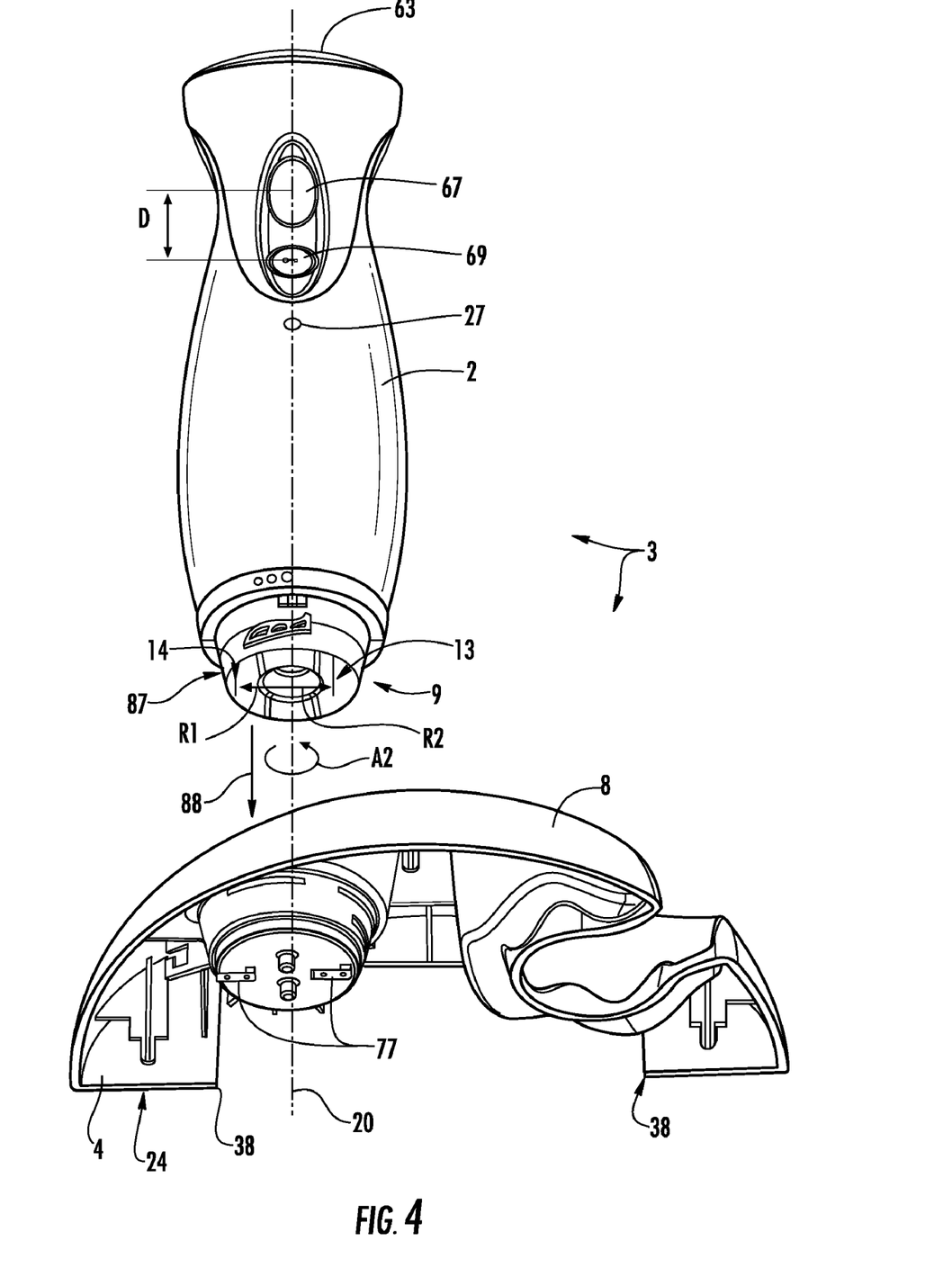
FIG. 4 shows the kitchen appliance and the charging station according to FIG. 3 in further perspective oblique view from below

FIG. 4 shows a stick blender according to the invention 2 with the charging station 8 according to FIG. 3 in a perspective oblique view. The on-switch 67 and the safety switch 69 are separated from each other by an actuation-enabling distance D. Here, "actuation-enabling" means that this distance D must be present between two fingers for the two switches to be effectively actuated. This ensures that the operation of the stick blender 2 cannot be accidentally or unintentionally triggered by a single finger. The charging system 3 comprises the first slider 13 and the second slider 14 which each have a distance from the longitudinal axis 20 corresponding to the radius R1, R2 of a slip ring 15, 16. The two slip rings 15, 16 (see FIG. 3) can be brought into electrical contact by means of contact legs 77. The holder 4 can be held on a wall 30 by means of a mounting plate 37 (see FIG. 5). The mounting plate 37 is attached to the holder 4 by means of a mounting plate groove 38. Due to the 360° coupling 9, the stick blender 2 can be placed effortlessly in the charging station 8 without having to pay special attention to the alignment of the stick blender 2 relative to the charging station 8. Guide surfaces 87, which are beveled with reference to a coupling direction 88, along which the kitchen appliance 1 is introduced and coupled into the charging station 8, further facilitate the coupling of the kitchen appliance 1 with the charging station 8. The guide surfaces 88 can be funnel-shaped. The guide surfaces 88 guide the kitchen appliance 1 to the correct position in the charging station 8.

Figure 5:
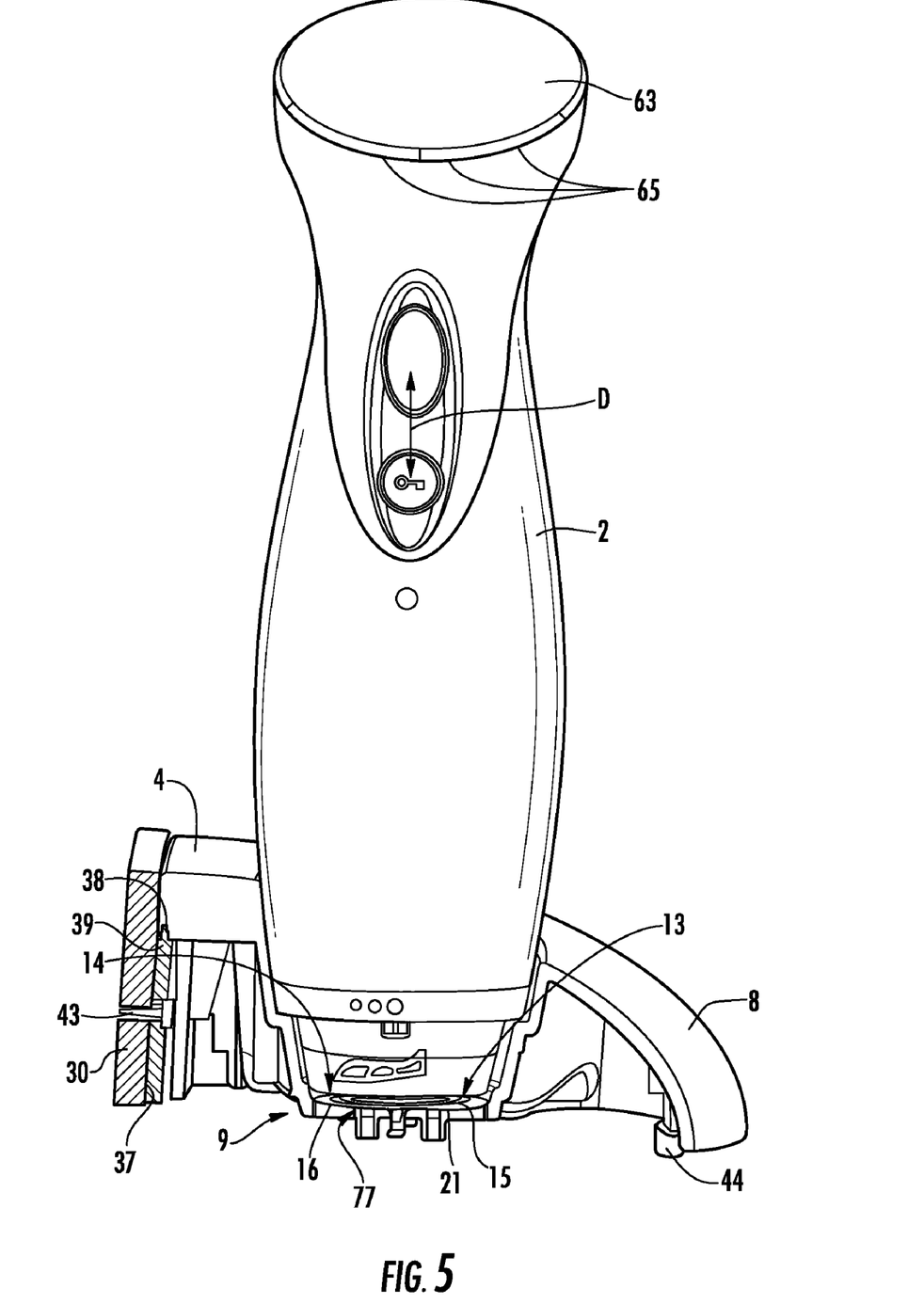
FIG. 5 shows the kitchen appliance according to the invention according to FIG. 1 in a side view, with the kitchen appliance being placed in a charging station shown in cross section

FIG. 5 shows the stick blender according to the invention 2 in a side view, with the kitchen appliance 1 being placed in a charging station 8 which is shown in cross section. Hereby, the electric coupling 9 of the stick blender 2 with the charging station 8 is established by the first sliding contact 10 with the first slider 13 and the first slip ring 15 and by the second sliding contact 11 with the second slider 14 and the second slip ring 16. The two slip rings 15, 16 each comprise contact legs 77 which can be electrically contacted electrically from below. The two slip rings 15, 16 also comprise fixing legs 21 which establish a hook and hence a secure attachment of the two slip rings 15, 16 on the charging station 8. The holder 4 can stand on a surface 31 with rubber feet 44 (see FIG. 3). However, it can also be screwed by means of the mounting plate 17, which is attached by a mounting plate groove 38 and a mounting plate spring 39 to the holder 4, by means of a screw 33 to a wall 30. The housing 5 of the stick blender 2 is connected by means of a housing clamping cover 63 along a second connecting line 65 to the two housing shells 56, 57.

Figure 6:
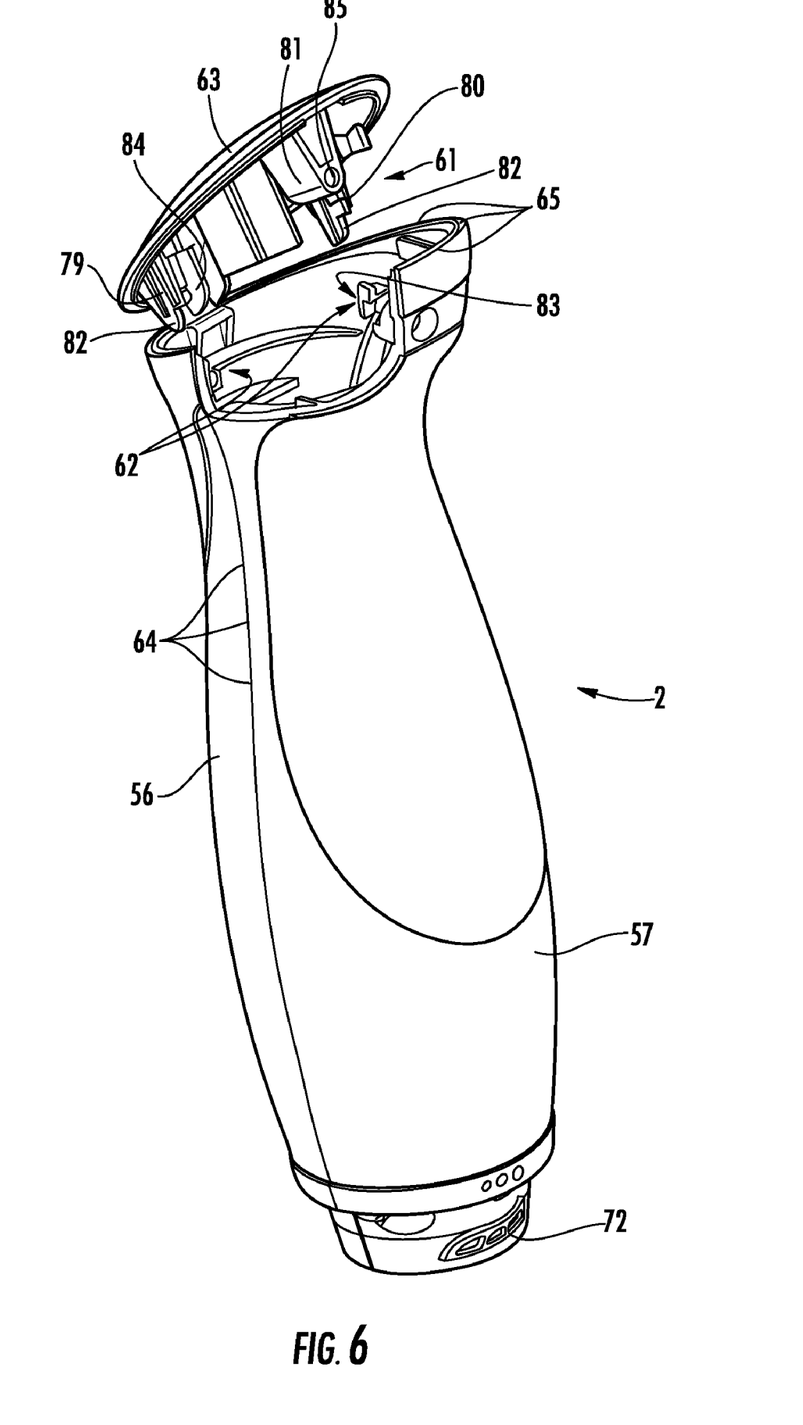
FIG. 6 shows the stick blender according to the invention according to FIG. 2 comprising an open housing clamping cover and a partially cut-open edge in a perspective oblique view from the side

FIG. 6 shows the stick blender according to the invention 2 according to FIG. 1 comprising an open clamping cover 63 and a partially cut-open second housing shell 57. The housing clamping cover 63 forms a clamping element 61 by which the first housing shell 56 is clamped to the second housing shell 57 in such a way that a substantially gap-free connection is established between the two housing shells 56, 57 along the first connecting line 64. For this, the housing clamping cover 63 engages by means of a fourth connecting element 84 in a corresponding receptacle on the first housing shell 56 and a first connecting element 79 and a second connecting element 80 with respective connecting projections 82 engage from behind on two separate connecting points 62 in corresponding separate connecting receptacles 83. A fourth connecting element 84 engages in a cover receptacle 46 on the first housing shell 56. If the housing clamping cover 63 is connected by means of a third connecting element 81 and a screw connection 85 to the second housing shell 57, the respective projections 82 press the first housing shell 56 on the two separate connecting points 62 against the second housing shell 57. This effects a gap-free connection of the two housing shells 56, 57 even if production tolerances along the first connecting line 64 (e.g. inaccuracies on the housing groove 58 or the housing spring 59 of the housing shells 56, 57) hinder the closing of the two housing shells 56, 57.

Figure 7:
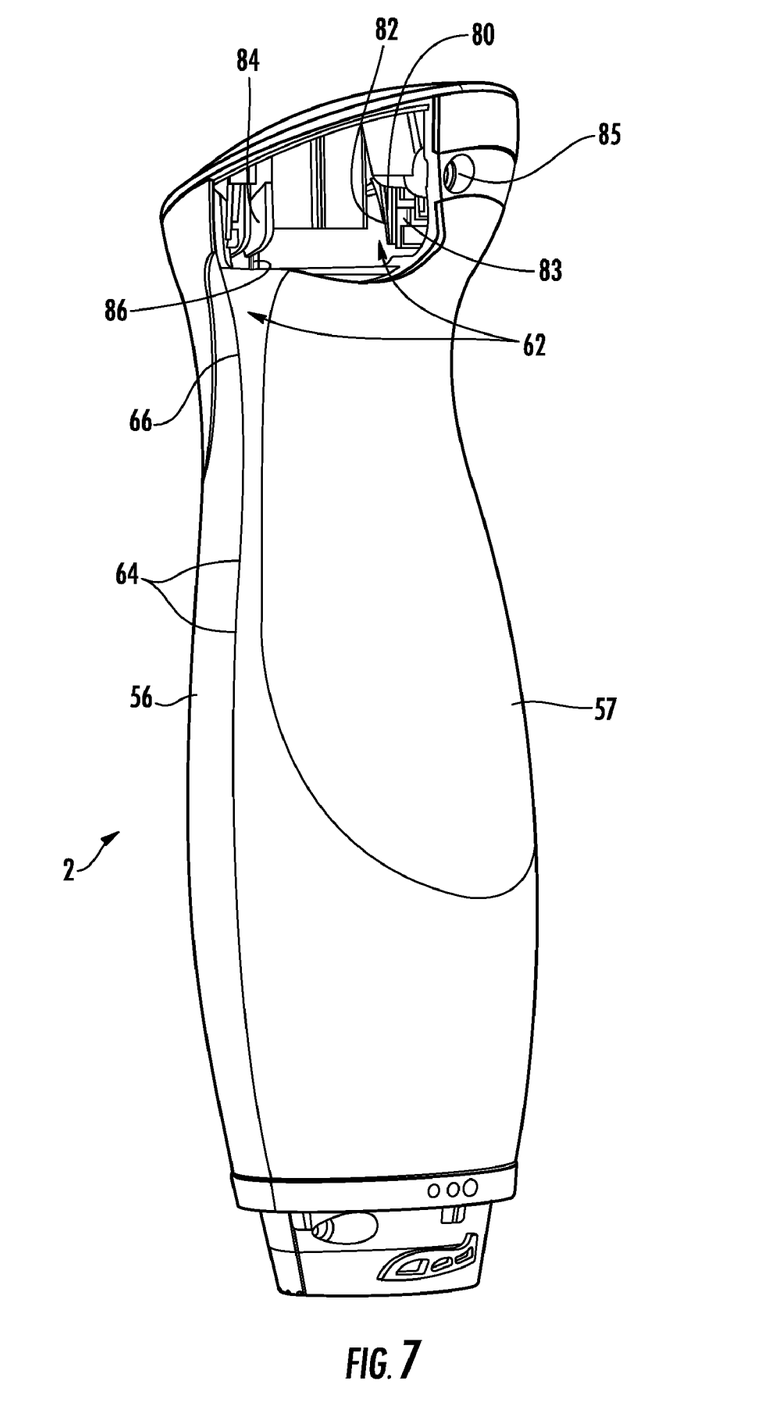
FIG. 7 shows the stick blender according to FIG. 6 with closed cover

FIG. 7 shows the stick blender according to the invention 2 according to FIG. 6 with a closed housing clamping cover 63 in a perspective side view with a partially cut-open second housing shell 57. It is evident that the connecting projection 82 engages behind the connecting holder 83 and subsequently presses the two edges 66 the housing shells 56, 57 together at the two fixing points 62.

Figure 8:
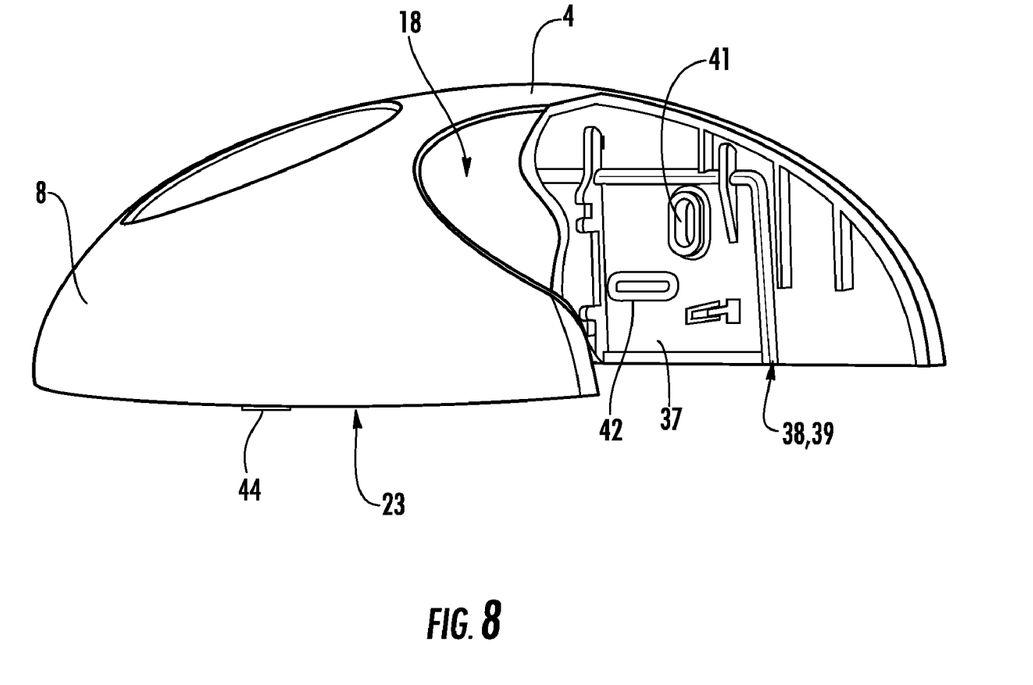
FIG. 8 shows a charging station according to the invention according to FIG. 4 in a side view with a partially cut-open charging station housing

FIG. 8 shows the holder 4 embodied as a charging station 8, which is partially cut-open, from the side with the tool holder 18. The holder 4 comprises rubber feet 44 on its standing surface 23. The holder can be attached to a wall 30 by means of the mounting plate 37 (see FIG. 5). Used for this are first 41 and second 42 oblong holes, with which a simple screw connection to the wall 30 can be established. The oblong holes 41, 42 permit the alignment of the mounting plate 37 in the vertical and horizontal directions and hence facilitate a particularly simple attachment of the holder 4 to the wall 30.

Figure 9:
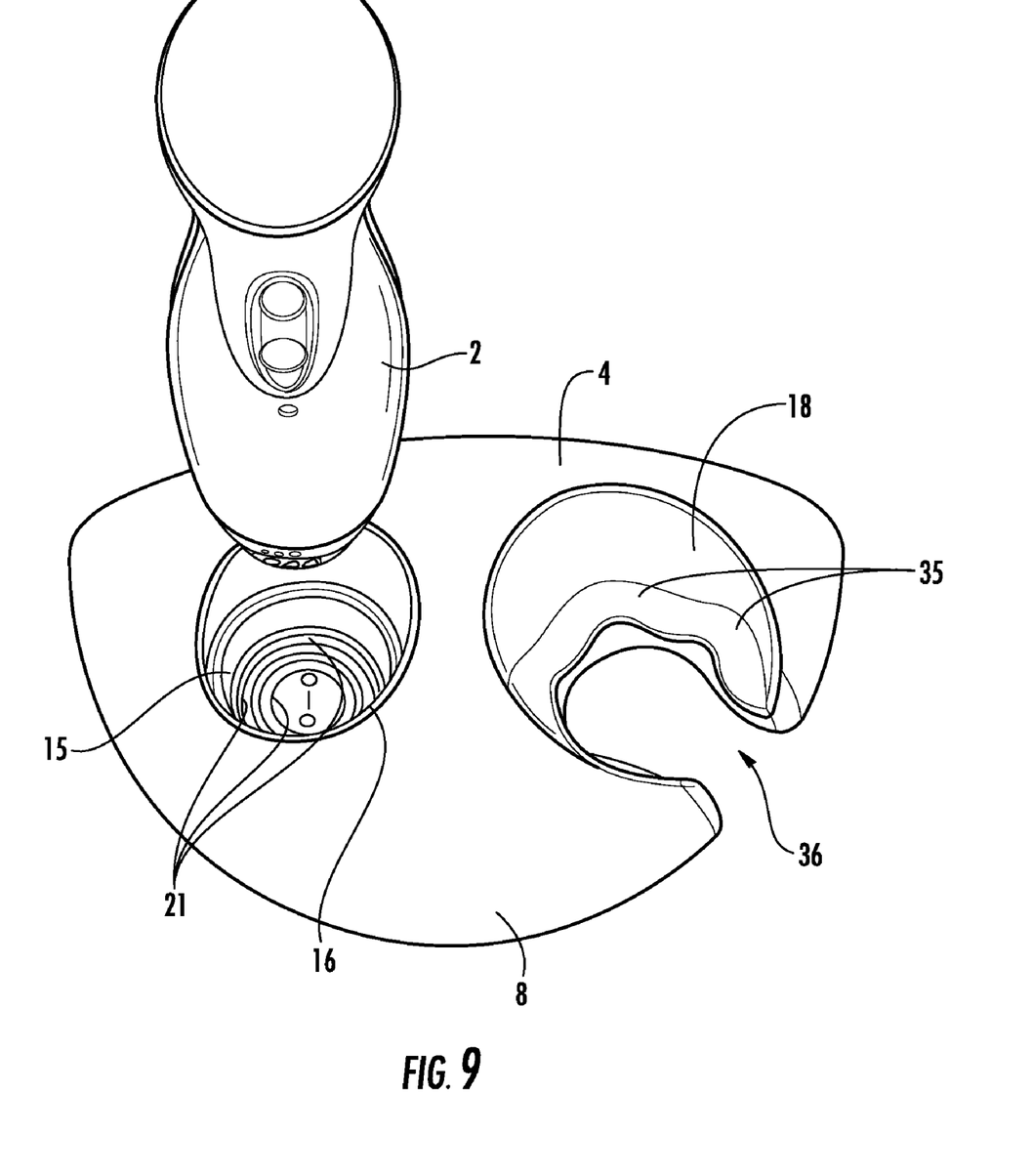
FIG. 9 shows the kitchen appliance and the charging station according to FIG. 3 in a perspective oblique view obliquely from above.

FIG. 9 shows the stick blender according to the invention 2 with the holder 4 embodied as a charging station 8 in a perspective oblique view. Shown on the charging station 8, are the slip rings 15, 16 which are fixed by means of fixing legs, which could comprise barbs (not shown), to the holder 4. The tool holder 18 comprises undulations 15 which are adapted to the contour 45 of the tool 17 in such a way that the tool 17 is secured in the tool holder 18. The radial gap 36 enables the tool 17 to be suspended in the tool holder 18.

The following will describe various further aspects associated with the invention. The individual aspects can each be used individually, i.e. independently of each other, or combined with each other as desired:

A particularly advantageous electromotive kitchen appliance 1, which is network-independent, comprises a lithium-ion battery 6 or a lithium-polymer battery. The battery 6 can have a specific capacity in a range of from 50 Ah/kg to 130 Ah/kg, in particular from 60 Ah/kg to 80 Ah/kg. In particular a safety device 7, in particular a protective circuit, is provided for the battery 6, with advantageously the safety device 7 counteracting an excessive overpressure and for this comprising in particular an overpressure exhaust opening. The safety device 7 can also comprise a temperature sensor 20 for the battery 6. The safety device can regulate the temperature of the battery 6. Advantageously, an electronic control device 26 is provided which monitors the charging and discharging of the battery 6 and, if appropriate, restricts the charging or discharging current. The maximum power output from the battery 6 is in particular in a range of from 200 W to 800 W, in particular in a range of from 250 W to 400 W. The kitchen appliance 1 is in particular embodied as a hand mixer, preferably as a stick blender 2. In a special embodiment, charging status display 27 is provided for the battery 6, in particular an LED display 28.

A preferred charging system 3 comprises a kitchen appliance 1 operated with a battery 6, in particular a stick blender 2, and a charging station 8 for the kitchen appliance 1 for charging the battery 6, with, for the charging of the battery 6, the kitchen appliance 1 being connectable to the charging station 8 by means of a coupling 9 in order to transmit electric energy from the charging station 8 to the kitchen appliance 1, with the coupling 9 permitting rotation of the kitchen appliance 1 relative to the charging station 8. The coupling 9 preferably permits rotation, in particular about the vertical, about an angle of rotation 12 of more than 90°, in particular more than 180°, preferably about more than 360°. In a special embodiment, the coupling 9 comprises at least two sliding contacts 10, 11 with two sliders 13, 14 and two slip rings 15, 16, wherein the two slip rings 15, 16 can be arranged concentrically and have different radii R1, R2 or the two slip rings 15, 16 can be arranged coaxially offset. The two slip rings 15, 16 are advantageously attached to the charging station 8. To avoid electrolytic corrosion from fluid spills on the charging station, the two slip rings 15, 16 can be attached to the kitchen appliance 1. Advantageously, the kitchen appliance 1 comprises a tool holder 18 for a tool 17 and the sliding contacts 10, 11 for the coupling 9 of the kitchen appliance 1 are arranged with the charging station 8 in such a way on or in the tool holder 18 that the sliding contacts 10, 11 on the kitchen appliance 1 are covered by the tool 17 on the kitchen appliance 1 during the use of the kitchen appliance 1. The slip rings 15, 16 are in particular stamped out of a sheet. Advantageously, a slip ring 15, 16 comprises at least one contact leg 77 angled to a plane formed through the slip ring 15, which protrudes through a feedthru 19 in a wall 29 on the kitchen appliance 1 or on the charging station 8. A slip ring 15, 16 can comprise at least two, preferably at least four, fixing legs 21 in particular angled to a plane formed through the slip ring 15, 16, to which the slip ring 15, 16 is fixed, in particular firmly clipped or hooked. The charging station 8 is advantageously produced by injection molding. The sliders 13, 14 are advantageously embodied as spring elements 22 and, when the kitchen appliance 1 and charging station 8 are coupled, are supported elastically on the slip rings 15, 16. Advantageously, guide surfaces 87 beveled and/or curved in relation to a coupling direction 88 are provided on the kitchen appliance 1 and/or on the charging station 8 to simplify the connection of the kitchen appliance to the charging station. The charging station 8 used is suitable and intended for use with the charging system.

A particularly advantageous multifunctional holder 4 for a stick blender 2 comprises a standing surface 23, with which the holder 4 can be placed on a level horizontal surface 31 and a fixing surface 24 which can be used to fix the holder 4 to a wall 30. Advantageously this provides for a first tool holder 18 for holding a tool 17, in particular a stirring and/or pureeing tool. The holder 4 comprises in particular electric lines 32 and advantageously forms a charging station 8 for a battery-6-operated stick blender 2. The holder 4 can comprise electric contact surfaces 33, in particular slip rings 15, 16 and/or slider 13, 14, for establishing an electric contact for the battery-6-operated stick blender. Advantageously, the tool holder 18 is designed so that the tool 17 can be placed in the tool holder 18 so that in particular the tool 17 is substantially located above the tool holder 18. Alternatively or additionally, the tool holder 18 can be designed so that the tool 17 can be suspended in the tool holder 18 so that in particular the tool 17 is substantially located below the tool holder 18. In a special embodiment, the tool holder 18 comprises a receiving base 34, which is undulated and in particular comprises at least four, advantageously at least five, undulations 35. The tool holder 18 can be annular, with advantageously the annular tool holder 18 comprising a substantially radial gap 36, with which the tool 17 can be inserted into the annular tool holder 18. The fixing surface 24 is advantageously embodied as a detachably attached mounting plate 37 on the holder 4. The mounting plate 37 can be embodied in such a way that it can be firmly clipped to the holder 4. The mounting plate 37 can in particular be inserted and attached on the holder 4 by means of a mounting plate groove 38 or mounting plate spring 39. It is advantageous if the mounting plate 37 comprises at least a first oblong hole 41 for attachment with a screw 43 to a wall 3. It is also advantageous for a second oblong hole 42 for the attachment of the holder 4 by a screw 43 to a wall 3 to be provided, which is in particular perpendicular to the first oblong hole 41. A further embodiment provides that rubber feet 44 are provided on the standing surface 23.

A particularly advantageous arrangement comprises the advantageous holder and a stick blender 2 which is held by the holder 4. The arrangement can also comprise a tool 17 for the stick blender 2, in particular a stirring and/or pureeing tool, with the tool 17 being held by means of a tool holder 18 of the holder 4. It is advantageous for the tool holder 18 to be shaped corresponding to the contour 45 of a tool head 46.

A particularly advantageous stick blender 2 comprises a housing 5 and a motor 47 located therein and a battery 6 located therein and provides that the motor 47 and the battery 6 are attached to a premounting support 48 that may be inserted the housing 5 which is attached to the housing 5. In an advantageous embodiment, it is provided that the premounting support 48 is connected to the housing 5 without adhesive and/or without screws. In an advantageous embodiment, it is provided that the premounting support 48 comprises latching elements 49, with which it is fixed, in particular clipped, to corresponding counterelements 50 on the housing 5. In an advantageous embodiment, it is provided that control electronics 51 are attached, in particular clipped on by means of first latching means 52, to the premounting support 48. In an advantageous embodiment, it is provided that an electric switch 67, 69, in particular an on-switch 67 is attached to the premounting support 48, preferably clipped on by means of second latching means 53. In an advantageous embodiment, it is provided that the motor 47, and/or the battery 6, is clipped onto the premounting support 48. In an advantageous embodiment, it is provided that the premounting support 48 is made of plastic, in particular by injection molding. In an advantageous embodiment, it is provided that the premounting support 48 is held in the housing 5 by means of supports 54, in particular support ribs. In an advantageous embodiment, it is provided that the housing 5 comprises two assemblable housing shells 56, 57, which can in particular be connected by means of a housing groove 58 or housing spring 59 in a gap-free manner. In an advantageous embodiment, it is provided that the premounting support 48 is formed from plastic, in particular by injection molding.

A particularly advantageous premounting support 48 is suitable and intended for the advantageous stick blender 2.

A particularly advantageous method for the production of a stick blender 2 comprising a housing, a motor 47 and a battery 6 located therein comprises the following steps: premounting of the motor 47 and of the battery 6 on a premounting support 48; insertion of the premounting support 48 with motor 47 and battery 6 in the housing 5; closure of the housing 5. In an advantageous embodiment, it is provided that the motor 47 and the battery 6 can be clipped onto premounting support 48. In an advantageous embodiment, it is provided that the premounting support 48 can be clipped onto the housing 5.

A particularly advantageous hand-held kitchen appliance 1, in particular a stick blender 2, comprising a housing 5 comprises at least one first 56 and one second 57 housing shell and a fixing means 60 for connecting the two housing shells 56, 57 to each other and provides that the fixing means 60 comprises a clamping element 61, which on the first housing shell 56 engages on at least two separate fixing points 62 and presses the first housing shell 56 against the second housing shell 57 at the two fixing points 62. In an advantageous embodiment, it is provided that the clamping element 61 is formed by a, in particular separate from the housing shells 56, 57, housing clamping cover 63, which is connected to the two housing shells 56, 57 along a second connecting line 65 in a gap-free manner. In an advantageous embodiment, it is provided that the clamping cover 63 clamps the two housing shells 56, 57 together. In an advantageous embodiment, it is provided that the clamping element 61 comprises at least a first 79, a second 80 and a third 81 connecting element, with the clamping element 61 being attached with the first 79 and second 80 connecting element on the first housing shell 56 and with the third connecting element 81 on the second housing shell 57. In a special further development, it is provided that the first 79 and second 80 connecting elements are formed by a connecting projection 82 which engages on the respective housing shell 56, 57 in a connecting holder 83. In an advantageous embodiment, it is provided that the third connecting element 82 establishes a screw connection 85. In an advantageous embodiment, it is provided that a fourth connecting element 84 is provided on the clamping element 61, with which the clamping element 61 is attached to the first 56 or second 57 housing shell. In an advantageous embodiment, it is provided that the two housing shells 56, 57 can be connected to each other on a first connecting line 64 formed along their edges 66 by means of a housing groove and housing spring. In an advantageous embodiment, it is provided that the housing shells 56, 57 comprise clip elements, with which the housing shells 56, 57 can be connected to each other. In an advantageous embodiment, it is provided that the kitchen appliance 1 is electromotive, in particular a stick blender 2. In an advantageous embodiment, it is provided that the housing shells 56, 57 are substantially embodied as half-shells. In an advantageous embodiment, it is provided that the two fixing points 62 have a distance between each other of at least 2 cm, in particular of at least 3 cm, preferably of at least 4 cm.

A particularly advantageous method for the production of a kitchen appliance 1, in particular a stick blender 2 comprising one first 56 and one second 57 housing shell and a housing clamping cover 63 so that the housing shells 56, 57 and the housing clamping cover 63 form a substantially closed housing 5, provides the following steps: assembly of the two housing shells 56, 57 along a first connecting line 64 formed by the edges 66 of the housing shells 56, 57; engagement of the housing clamping cover 63 on at least two separate fixing points 62 on the first housing shell 56; pressing together of the two housing shells 56, 57 by means of the housing clamping cover 63 in such a way that the first housing shell 56 is pressed against the second housing shell 57 at the two fixing points 62.

A particularly advantageous electromotive kitchen appliance 1, in particular an electromotive hand-held appliance, preferably a stick blender 2, comprising an on-switch 67 provides that a finger-actuated electric interlock 68 is provided for the on-switch 67. Finger-actuated means that the interlock is suitable for and intended for manual unlocking by a finger. In an advantageous embodiment, it is provided that the interlock 68 comprises a safety switch 69 separate from the on-switch 67 separate. In an advantageous embodiment, it is provided that a actuation-enabling distance D between the on-switch 67 and the safety switch 69 is at least 0.5 cm, in particular at least 0.8 cm, preferably at least 1.2 cm, and in particular less than 4 cm, in particular less than 3 cm, preferably less than 2.5 cm. In an advantageous embodiment, it is provided that the interlock 68 comprises a time integration circuit 70, with which the on-switch 67 is only unlocked with a time delay after the actuation of the safety switch 69. In an advantageous embodiment, it is provided that the time delay of the time integration circuit 70 is at least 0.1 s, in particular at least 0.2 s, preferably at least 0.3 s. In an advantageous embodiment, it is provided that the interlock 68 comprises a time integration circuit 70, with which the on-switch 67 is only unlocked with a time delay after the actuation of the safety switch 69 for a predefined time window. In an advantageous embodiment, it is provided that the duration of the time window lies within a range of from 0.3 s to 2 s, in particular in a range of from 0.5 to 1 s. In an advantageous embodiment, it is provided that a further electric actuating means 71, in particular an electric step switch is provided for setting an electric power stage of the kitchen appliance 1, with the actuation means 71 being provided in particular on the, in particular together and in connection with the, on-switch 67. In an advantageous embodiment, it is provided that the safety switch 69 only remains switched on for as long as it is actuated, in particular depressed, and otherwise switches off again.

A particularly advantageous method for switching off/on a kitchen appliance 1, in particular an electromotive hand-held appliance, preferably a stick blender 2, which comprises an on-switch 67 and safety switch 69 separate therefrom, with the on-switch 67 being unlocked when a safety switch 69 is actuated, provides that the safety switch 69 is switched electronically. In an advantageous embodiment, it is provided that the on-switch 67 is unlocked when the on-switch 67 is actuated only after the actuation of the safety switch 69, in particular with a time delay of at least 0.1 s, in particular at least 0.2 s, preferably at least 0.3 s. In an advantageous embodiment, it is provided that the unlocking is only effective for the duration of a predefined time window in a range of from 0.3 s to 2 s, in particular in a range of from 0.5 s to 1 s. In an advantageous embodiment, it is provided that the on-switch 67 can only be unlocked while the safety switch 69 is held. In an advantageous embodiment, it is provided that, after unlocking, the on-switch 67 also remains switched on when the safety switch 69 is no longer held.

The invention relates to a hand-held kitchen appliance 1, in particular a stick blender 2, comprising a housing 5 with at least one first 56 and one second 57 housing shell and a fixing means 60 for connecting the two housing shells 56, 57 and provides that the fixing means 60 comprises a clamping element 61, which engages on the first housing shell 56 on at least two separate fixing points 62 and presses the first housing shell 56 against the second housing shell 57 at the two fixing points 62. The kitchen appliance according to the invention 1 and the method for producing the same are characterized by structural simplicity and also achieve good sealing of the housing 5 despite the use of a reduced number of screw connections.

LIST OF REFERENCE NUMBERS

1 Kitchen appliance
2 Stick blender
3 Charging system
4 Holder
5 Housing
5 Battery
7 Safety device
8 Charging station
9 Coupling
10 First sliding contact
11 Second sliding contact
12 Angle of rotation
13 Second slider
14 Second slider
15 First slip ring
16 Second slip ring
17 Tool
18 Tool holder
19 Feedthru
20 Longitudinal axis
21 Fixing legs
22 Spring elements
23 Standing surface
24 Fixing surface
25 Temperature sensor
26 Control device
27 Charging status display
28 LED display
29 Wall
30 Wall
31 Surface
32 Electric lines
33 Contact surfaces
34 Receiving base
35 Undulations
36 Radial gap
37 Mounting plate
38 Mounting plate groove
39 Mounting plate spring
40 Arrangement
41 First oblong hole
42 Second oblong hole screw
43 Screw
44 Rubber feet
45 Contour
46 Tool head
47 Motor
48 Premounting support
49 Latching elements
50 Counterelements
51 Control electronics
52 First latching means
53 Second latching means
54 Supports
55 Screw fixing means
56 First housing shell
57 Second housing shell 58 Housing groove
59 Housing spring
60 Fixing means
61 Clamping element
62 Fixing points
63 Housing clamping cover
65 First connecting line
66 Second connecting line
66 Edges
67 On-switch
68 Electric interlock
69 Safety switch
70 Time integration circuit
71 Actuation means
72 Bayonet lock
73 Fiber-optic conductor
74 Latching element
75 Rotor
76 Shaft
77 Contact leg
78 Printed circuit board
79 First connecting element
80 Second connecting element
81 Third connecting element
82 Connecting projection
83 Connecting holder
84 Fourth connecting element
85 Screw connection
86 Cover receptacle
87 Guide surface
88 Coupling device
89 Rubber membrane
D Actuation-enabling distance
R1 Radius of the first slip ring 15
R2 Radius of the second slip ring 16

The invention claimed is:

1. A hand-held kitchen appliance comprising:
a substantially cylindrical housing shell having
a first housing shell portion,
a second housing shell portion, and
a housing clamping cover, the housing clamping cover including a connecting assembly for fixedly connecting the first housing shell portion and the second housing shell portion together, the connecting assembly including a clamping element for engaging the first housing shell portion on at least two separate fixing points of the first housing shell portion and biasing the first housing shell portion against the second housing shell portion at the at least two separate fixing points.

2. The kitchen appliance according to claim 1, wherein the housing clamping cover is separate from the first housing shell portion and the second housing shell portion and is connected to the first housing shell portion and the second housing shell portion along a connecting line in a gap-free manner.

3. The kitchen appliance according to claim 2, wherein the housing clamping cover clamps the first housing shell portion and the second housing shell portion together.

4. The kitchen appliance according to claim 1, wherein the clamping element includes at least three connecting elements including a first connecting element, a second connecting element and a third connecting element, wherein the clamping element is fixed, by the first connecting element and the second connecting element of the clamping element, on the first housing shell portion and the clamping element is fixed, by the third connecting element of the clamping element, on the second housing shell portion.

5. The kitchen appliance according to claim 4, wherein the first housing shell portion and the second housing shell portion each include a connecting holder formed thereon and the first connecting element and the second connecting element are each formed by a connecting projection with each connecting projection configured for engaging a respective housing shell portion in a respective connecting holder.

6. The kitchen appliance according to claim 4, wherein the third connecting element is configured for connection using a screw.

7. The kitchen appliance according claim 4, further comprising a fourth connecting element for fixing the clamping element to one of the first housing shell portion and the second housing shell portion, wherein the fourth connecting element is formed on the clamping element.

8. The kitchen appliance according claim 1, wherein the first housing shell portion and the second housing shell portion are connectable to one another along a first connecting line formed along respective edges of the first housing shell portion and the second housing shell portion with the connection being facilitated by at least a combination of a housing groove and a housing spring.

9. The kitchen appliance according to claim 1, wherein the first housing shell portion and the second housing shell portion include a plurality of clip elements for connecting the first housing shell portion and the second housing shell portion together.

10. The kitchen appliance according claim 1, wherein the kitchen appliance is formed as an electrically powered stick blender.

11. The kitchen appliance according to claim 1, wherein the first housing shell portion and the second housing shell portion are each configured substantially as half-shells.

12. The kitchen appliance according to claim 1, wherein the two fixing points are spaced from one another at a distance of at least about 2 cm to at least about 4 cm.

13. The kitchen appliance according to claim 1, wherein the kitchen appliance is a stick blender.

14. A method for producing a kitchen appliance having a first housing shell portion, a second housing shell portion and a housing clamping cover wherein the first housing shell portion, the second housing shell portion and the housing clamping cover form a substantially closed, substantially cylindrical housing assembly, the method comprising:
assembling the first housing shell portion and the second housing shell portion along a connecting line formed by edges formed respectively on the first housing shell portion and the second housing shell portion;
engaging the housing clamping cover with the first housing shell portion on at least two separate fixing points formed on the first housing shell portion; and
pressing the first housing shell portion and the second housing shell portion together using the housing clamping cover in a manner wherein the first housing shell portion is pressed against the second housing shell portion on the at least two separate fixing points.

15. The method according to claim 14, wherein the kitchen appliance is a stick blender.

* * * * *

UNITED STATES PATENT AND TRADEMARK OFFICE
CERTIFICATE OF CORRECTION

PATENT NO.       : 8,353,620 B2                                                                 Page 1 of 1
APPLICATION NO. : 11/990537
DATED            : January 15, 2013
INVENTOR(S)      : Ogrizek et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 303 days.

Signed and Sealed this

First Day of September, 2015

Michelle K. Lee
*Director of the United States Patent and Trademark Office*